United States Patent [19]

Edie

[11] 4,049,875
[45] Sept. 20, 1977

[54] BONDING RUBBER TO FERROUS METAL THROUGH A DEPOSIT OF COPPER AND ADHESIVE AND LAMINATE THEREFROM

[75] Inventor: Dennis L. Edie, Kobe, Japan

[73] Assignee: Honny Chemicals Company, Ltd., Kobe, Japan

[21] Appl. No.: 610,695

[22] Filed: Sept. 5, 1975

[30] Foreign Application Priority Data

Sept. 14, 1974 Japan ............................... 49-106505

[51] Int. Cl.² ............................................. B32B 15/06
[52] U.S. Cl. ................................... 428/462; 156/331; 427/405; 428/515; 428/519; 428/463; 428/469; 428/461
[58] Field of Search ............... 428/462, 461, 463, 519, 428/515, 469; 427/405; 156/331

[56] References Cited

U.S. PATENT DOCUMENTS

| | | | |
|---|---|---|---|
| 1,906,436 | 5/1933 | Thompson | 156/338 X |
| 3,849,172 | 11/1974 | Chin et al. | 428/462 |
| 3,857,726 | 12/1974 | Van Gils | 428/462 |

Primary Examiner—P. C. Ives
Attorney, Agent, or Firm—Stevens, Davis, Miller & Mosher

[57] ABSTRACT

The bond strength of composite articles of rubber adhered to ferrous metal substrates through an adhesive is substantially improved at ambient and elevated temperatures by depositing a loosely adhered layer of copper on said ferrous metal substrate, applying an adhesive thereover comprising an interpolymer containing about 50 to about 99% by weight of a conjugated diene, about 1–45% by weight of a heterocyclic base and 0 to about 40% by weight of at least one additional copolymerizable monomer, thereafter contacting said adhesive with the rubber to be bonded and bonding by heat and pressure.

27 Claims, 1 Drawing Figure

Figure 1:
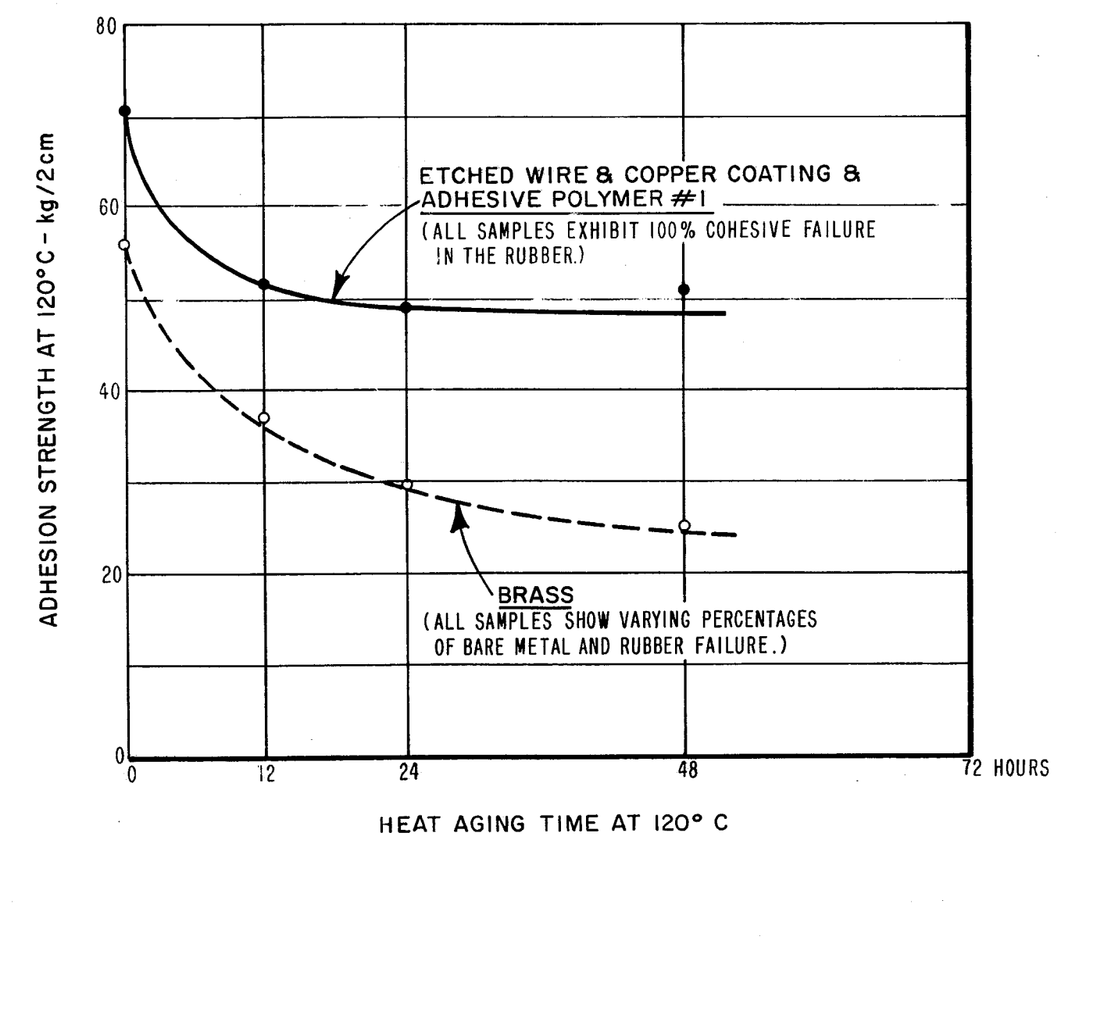

BONDING RUBBER TO FERROUS METAL THROUGH A DEPOSIT OF COPPER AND ADHESIVE AND LAMINATE THEREFROM

This invention relates to a process for the bonding of rubber to ferrous metal substrates and to novel composite structures obtained by that process.

More particularly the present invention relates to the bonding of rubber to ferrous metal substrates by depositing a copper layer on said substrate followed by bonding through an adhesive comprising an interpolymer of a conjugated diene and a heterocyclic nitrogen base.

The vulcanization or the adhesion of rubber to metals has heretofore been accomplished by various processes. These include brass, bronze and zinc plating; the use of halogenated natural or synthetic rubbers with and without special adhesion promoting additives such as di-C-nitroso compounds or cobalt naphthenate, etc.; isocyanates or isocyanate rubber blends; and synthetic resins of the phenol formaldehyde type. Each suffers from certain obvious weaknesses.

Chlorinated and brominated natural and synthetic rubbers, particularly when formulated to include crosslinking and adhesion promoting additives such as di-C-nitrosated aromatics give good adhesive bonds between various metals and natural and synthetic rubbers. Because of their somewhat polar nature, they are able to adhere to metals without covalent bonding with the metal surface. This lack of a chemical bond to the metal surface is obviously a disadvantage for the adhesive strength of such systems falls rapidly with increasing temperature.

Polyfunctional isocyanates such as P, P', P" triisocyanato triphenyl methane by themselves and as additives to rubber solutions have been known for many years to provide good bond strength between rubber and metals. While the mechanism of adhesion is not clearly understood, it is postulated that the isocyanates can chemically react with both the rubber and the metal surface. In the former case, active hydrogens, e.g., hydroxy or carboxyl groups generated by oxidation during rubber processing provide a reaction site for the formation of urethane and other linkages. In the bonding to the metal surface it has been suggested that oxide surfaces which frequently contain some hydroxy groups could react with the isocyanate group. In any event the solvent resistance and rate of reduction of bond strength with increasing temperature of isocyanates bonded rubber to metal parts is better than would be expected if the adhesion to metal were due only to physical forces. The disadvantages of isocyanate based systems include high moisture sensitivity and very short pot life due to the high reactive isocyanate groups and the poor thermal aging characteristics of this bond.

Synthetic resins of the phenol-formaldehyde type, usually blended with a rubbery polymer latex also can be used to bond rubber to metal. This sort of adhesive can chemically combine with an unsaturated rubber either by a migration of sulfur and accelerators from the rubber into the adhesive layer followed by a covulcanization or possibly by reaction of the methylol groups of the resole with the rubber itself. However the adhesion to the metal surface is physical in nature, i.e. Van der Waal type forces and the bond strengths to metal are generally poor, especially at elevated temperatures.

The use of a thin coating of copper by electroless deposition on a metal surface to improve the bond between the metal and vulcanizable rubber was first patented in 1879 (U.S. Pat. No. 215,034). Presumably, during the sulfur vulcanization of the unsaturated rubber in contact with the copper plated metal surface, both the copper and the unsaturated rubber compete simultaneously for the sulfur. Since the sulfur has a valence of two, it is postulated that for a portion of the sulfur at the interface one valence is satisfied by reacting with the copper while the other bonds to the rubber. In such a way a covalent linkage is formed between the metal surface and the rubber thus bonding one to the other. The bond formed is rather weak. Numerous patented improvements followed this disclosure such as depositing the copper electrolytically instead of by the original electroless deposition (British Pat. No. 929,211), depositing the copper from organic solvents, (U.S. Pat. Nos. 1,883,973 and 1,906,436), depositing the copper in the presence of surfactants etc. These modifications were aimed at improving the uniformity and adhesion of the copper to the metal surface and obtaining a reasonable rate of deposition. Since these bonds were still weak, the copper plated metal was often coated with a tie-coat to improve the wetting of the metal surface prior to bonding to a vulcanizable rubber. These tie coats typically consisted of natural rubber plus curatives dissolved in a suitable solvent. Unfortunately none of these approaches corrects the weaknesses that prevent pure copper coatings from being commercially practical for bonding rubber to metal. There are two main reasons for the failure of pure copper as an adhesive. First, it appears that the shear strength of the copper sulfide formed is comparatively weak, or perhaps the shear weakness is at the interface of the copper sulfide-unreacted copper. In any event, the bonds were too weak for commercial applications. And secondly, copper reacts very rapidly with the sulfur available at the metal-rubber interface. This can be so fast that there is no sulfur left in the immediate vicinity of the surface for bonding to and vulcanization of the unsaturated rubber. This results in no bond being formed between the metal and the rubber.

The use of brass plating and in some applications bronze or zinc plating overcomes the bond strength deficiency of pure copper "adhesive," however these processes, while commercially practical, still suffer from certain serious limitations. Any variations in the composition, crystal structure or thickness of the alloy coating can result in very poor adhesion to rubber. The plating processes are slow, often requiring as much as a minute to develop a satisfactory coating. The plating baths, especially for brass, use cyanides which are hazardous and result in a serious waste disposal problem.

While satisfactory adhesion can be achieved between rubber and brass, bronze or zinc plated metals, the requirement of good adhesion severely limits the rubber formulator for only certain formulations result in satisfactory adhesion. It is common practice, for example to use metal naphthenates or resorcinol-hexamethyleneimine combinations in the rubber to be bonded in order to improve the bond strength to brass. These approaches both add to the cost and adversely effect the physical properties of the rubber to be bonded.

In U.S. Pat. No. 2,978,377 it is mentioned that copolymers of butadiene and a vinyl pyridine such as 2-methyl-5-vinyl pyridine have been used for bonding rubber to metal and that when used with natural rubber or a GRS (1,3 butadiene-styrene) composition an excellent bond is obtained. No mention is made of the strength of such bonds at elevated temperatures and no data are given. In any event, it has been found that there are many natural rubbers and GRS compositions that if bonded to metals with copolymers of vinyl pyridines and butadiene result in very poor bond strengths even at normal ambient temperature.

The purpose of the present invention is to bond compounded rubber to metals, especially iron and steel, utilizing rapid, easily controlled processes.

Another object of the present invention is to bond rubber to metal, especially steel bead wire and cord for use in steel reinforced tires, belts and hoses using a copper salt treatment of the metal surface followed by a coating of an adhesive composed of a rubbery interpolymer comprising a conjugated diene and heterocyclic nitrogen base.

Still another object of this invention is to provide a bond between the steel wire or cord and the surrounding rubber that will retain a large measure of its bond strength at the elevated temperatures often encountered during the use of the aforementioned tires, belts, etc.

Yet another object of this invention is to provide good bond strengths between a wide selection of compounded rubbers and an iron or steel surface, said bond retaining a large measure of its bond strength over a wide temperature range.

It has now been found that by first depositing a loosely adherent coating of copper on a ferrous surface, rinsing the surface with water, and then applying over this coating a second coating comprising a rubbery interpolymer of conjugated dienes and heterocyclic nitrogen bases such a combination of coatings in contact with a compounded unsaturated rubber forms a bond of unexpectedly high bond strength especially at elevated temperatures during the vulcanization of the unsaturated rubber.

The above mentioned loosely adherent coating of copper may contain halide salts and/or oxides or hydroxides of copper and iron. The combination of the copper coating and the interpolymer adhesive shows a definite and unexpected synergistic effect on the bond strengths with a variety of compounded rubbers.

It has further been determined that an advantageous method of forming the aforementioned loosely adherent coatings of copper is by electroless plating from aqueous solutions of cupric salts especially in the presence of the strongly accelerating halide ions. Cuprous salts are not effective.

The advantages of this discovery over the prior art are readily apparent. The present process does not require the careful control of alloy composition characteristic of the brass and bronze processes and is much faster than either of those processes. Careful control of the plating process to insure a smooth tightly adhering metal coating is unnecessary in the present process. Another highly significant advantage of this process over the presently used brass, bronze and zinc bonding processes is the wide range of natural and synthetic rubber types and rubber formulations that can be bonded, as can be seen in the working examples. No adhesion promoting additives are needed in the rubbers to insure adequate bond strength when using the process of this invention.

The copper coatings of this invention are preferably applied by electroless plating using an aqueous solution of cupric ion containing the highly accelerating halide ions chloride and bromide. The presence of the halide ions apparently accelerates the rate of deposition of the copper coating to such an extent that a loose, weakly adherent coating of copper results on the metal surface. Those skilled in the art will of couse realize that many methods are known for plating copper onto a metal surface. For example, electroless plating can be accomplished from aqueous or organic solutions of copper salts. Any of these methods can be used in the practice of this invention so long as it gives loosely adherent coatings of copper similar to that obtained, for example, by electroless plating from an aqueous solution of cupric chloride. The treating time that generates the aforementioned copper coating, is preferably 0.5-60 seconds, but can be as low as 0.1 seconds or less depending on the type of anion that exists in an aqueous solution of cupric salt as well as concentration, temperature and degree of agitation of the solution.

As indicated above, the preferred method for producing the loosely adherent copper coating, that is a coating which can be wiped off with a paper or cloth towel, is by electroless deposition from a cupric chloride or bromide solution. Other salts of organic and inorganic acids have been found to deposit a smooth, tightly adhered, coating which does not produce the improved bond strength of this invention. However such other salts, for example formates, acetates, nitrates, phosphates, sulfates, tartrates, borates, etc. can be employed in solution with added halide ions which accelerate deposition and cause formation of the loosely adherent copper coating.

As indicated above, the electroless deposition may be accomplished by dipping the ferrous article in the cupric solution for a period of time from a fraction of a second to about sixty seconds. Other conditions of this dipping step, i.e. concentration of cupric salt, temperature of the solution and degree of agitation of the solution may be widely varied by the operator, with the best results for any particular system being easily determined. Generally a concentration of about 1 to 10 percent may be utilized at temperatures from 15° C to 40° C, with or without agitation. Times of more than sixty seconds may be used, but are unnecessary.

The rubber interpolymers used as the adhesive in the present invention may be copolymers of a conjugated diene with a heterocyclic nitrogen base or interpolymers of the above with at least one additional copolymerizable monomer. Those polymers applicable in the present invention are comprised of about 40-99% by weight of the conjugated diene, about 1-45% by weight of a heterocyclic nitrogen base with 5-15% being preferred and 0 to about 40% by weight of at least one additional copolymerizable monomer. With copolymers the amount of heterocyclic nitrogen base is desirably maintained at 1-25% by weight.

Within these limits the compositions of the copolymers can be varied widely without sacrificing the excellent hot bond strengths achieved with this invention. Commercially, due to the expense of, e.g. vinyl pyridines, copolymers with relatively low levels of copolymerisable heterocyclic nitrogen base are preferred and amounts as low as 1% have been found to be effective.

These copolymers can be prepared by any method known in the art such as thermal, solution, suspension, mass, and emulsion polymerization. The copolymerization can be free radical or anionic, random, block or stereospecific. The preferred method is by emulsion polymerization.

The conjugated dienes useful in this invention are preferably those which contain four to six, inclusive, carbon atoms per molecule but those containing more carbon atoms per molecule, e.g., eight can also be used. These compounds include hydrocarbons such as 1,3 butadiene, isoprene, piperylene, methyl pentadiene, 2,3 dimethyl-1,3-butadiene, 2,3-diethyl-1,3-butadiene, halohydrocarbons such as haloprenes, e.g. chloroprene, methyl chloroprene and others; and alkoxy hydrocarbons such as methoxy and ethoxy derivatives of the above conjugated dienes e.g. 2 methoxybutadiene and 3-ethoxy-1,3-butadiene.

The polymerizable heterocyclic nitrogen bases which are applicable in this invention are those of the pyridine, quinoline, and isoquinoline series which are copolymerizable with a conjugated diene and contain one and only one $CH_2=C<$ substituent and preferably the group is where R is either a hydrogen or a methyl group. That is, the substituent is either a vinyl or an alphamethylvinyl (isopropenyl) group. Of these compounds, the pyridine derivatives are preferred. Various substituted derivatives are also applicable but the total number of carbon atoms in the nuclear substituted groups, such as alkyl groups, should not be greater than 15 because the polymerization rate decreases somewhat with increasing size of the alkyl group. Compounds where the alkyl substituents are methyl and/or ethyl are available commercially and are preferred in this invention.

These heterocyclic nitrogen bases have the formula where R is selected from the group consisting of hydrogen, alkyl vinyl, alpha-methylvinyl, alkoxy, halo, hydroxy, cyano, aryloxy, aryl and combinations of these groups such as halo-alkyl, alkylaryl, hydroxyaryl, and the like, one and only of said groups being of the type $CH_2=C<$ and preferably being a vinyl or alpha-methyl vinyl group; and the total number of carbon atoms in the nuclear substituted groups being not greater than 15. As has been indicated, the preferred compounds are those wherein the R groups, other than the vinyl or alphamethylvinyl group, are hydrogen or alkyl of 1 to 4 carbon atoms. Examples of such compounds are 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6 tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methylpyridine; 2-cyano-5-(alphamethylvinyl)pyridine; 3-vinyl-5-phenyl pyridine; 2-(paramethylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alphamethylvinyl)-8-dodecyl quinoline; 3-vinylisoquinoline; 1,6-dimethyl-3-vinylisoquinoline; 2-vinyl-4-benzyl-quinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

Interpolymers cann be prepared from a mixture of two of the previously mentioned conjugated dienes and a heterocyclic nitrogen base or from a conjugated diene and two different heterocyclic nitrogen bases. It is, however, more common to prepare interpolymers from a single conjugated diene, a single heterocyclic nitrogen base and at least one other polymerizable monomer. The latter monomers comprise organic compounds containing at least one polymerizable ethylenic group of the type $>C=C<$. These compounds are well known in the art and include, for example, the alkenes, alkadienes, and the styrenes such as ethylene, propylene, 1-butylene, 2-butylene, isobutylene, 1-octene, 1,4-pentadiene, 1,6-hexadiene, 1,7-octadiene, vinyltoluene, vinylxylene, ethylvinylbenzene, vinylcumene, 1,5-cyclooctadiene, cyclohexane, cyclooctene, benzylstyrene, chlorostyrene, bromostyrene, fluorostyrene, trifluoromethylstyrene, iodostyrene, cyanostyrene, nitrostyrene, N,N-dimethylaminostyrene, 3-phenyl-3-butene-1-ol, p-methoxystyrene, vinyl naphthalene, acetoxystyrene, methyl 4-vinylbenzoate, phenoxystyrene, p-vinylphenyl ethyl ether, and the like; the acrylic and substituted acrylic monomers such as methyl acrylate, ethyl acrylate, methyl methacrylate, methacrylic anhydride, acrylic anhydride, cyclohexyl methacrylate, benzyl methacrylate, isopropyl methacrylate, octyl methacrylate, acrylonitrile, methacrylonitrile, methyl alpha-chloroacrylate, ethyl alpha-ethoxy-acrylate, methyl alpha-acetamidoacrylate, butyl acrylate, ethyl alpha-cyanoacrylate, 2-ethylhexyl acrylate, phenyl acrylate, phenyl methacrylate, alpha-chloroacrylonitrile, ethyl methacrylate, butyl methacrylate, methyl ethacrylate, methacrylamide, N,N-dimethylacrylamide, N,N-dibenzylacrylamide, N-butylacrylamide, methacrylyl formamide, and the like; the vinyl esters, vinyl halides, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl flouride, vinylidene chloride, vinylidene cyanide, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-vinyloxazolidinone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, vinyl isocyanate, tetrafluoroethylene, chlorotrifluoroethylene, nitroethylene, vinyl furane, vinyl carbazole, vinyl acetylene, and the like.

The function of the additional monomer can be merely that of cost reduction with little or no influence on the bond strength and other properties of the adhesive or it may be incorporated to modify a specific property of the adhesive. An example of this would be the incorporation of monomers such as nitriles, esters, amides, etc. that would increase the polarity of the adhesive to make it more compatible with rubbers of higher polarity. Such modifications can easily be made by those skilled in the art and are considered to lie within the scope of this invention.

The compounded rubbers that may be bonded by the aforementioned interpolymers include natural and synthetic rubbers and their blends having a fairly high degree of unsaturation, i.e. having a minimum of about 70 mole percent polymerized conjugated diene. Examples of suitable synthetic rubbers are polybutadiene, polyisoprene, copolymers of butadiene with styrene or acrylonitrile, polychloroprene etc.

These rubbers are conventionally compounded with one or more fillers, plasticizers, curatives and antioxidants. The total amount of filler used is generally in the range of 25 to 150 parts by weight per 100 parts by weight of rubber. Fillers include the various silicas, clays, calcium carbonate; calcium silicate, titanium dioxide and carbon black. In preparing compounded stocks to be employed in the fabrication of tires, it is generally preferred that at least a portion of the filler be carbon black. The plasticizers are generally used in amounts ranging from 1.0 to 100 parts by weight of plasticizer per 100 parts by weight of rubber. The amount of plasticizer actually used will depend upon the softening effect desired. Examples of suitable plasticizers include aromatic extract oils, petroleum softeners including asphaltenes, saturated and unsaturated hydrocarbons, and nitrogen bases, coal tar products, cumarone-indene resins, and esters such as dibutyl phthalate, and tricresyl phosphate. It is to be understood that mixtures of these plasticizers can be employed. The curatives used in the curing system include a vulcanizing agent, and generally one or more vulcanization accelerators together with one or more accelerator activators. The amount of these materials used in the system generally falls in the following ranges: 0.5 to 5.0 parts by weight of the vulcanizing agent, 0.5 to 3.0 parts by weight of the accelerator, 0.5 to 20.0 parts by weight of the accelerator activator, all ranges being based on 100 parts by weight of rubber. Examples of suitable vulcanizing agents are sulfur, sulfur-liberating agents, such as thiuram disulfide, a thiuram polysulfide, or an alkylphenolsulfide, or a peroxide, such as dicumyl peroxide, or dibenzoyl peroxide. When peroxide compounds are used as vulcanizing agents, the accelerator and the accelerator activator are frequently unnecessary. Vulcanization accelerators which can be used include dithiocarbamates, thiuram sulfides, and mercaptobenzothiazoles. Examples of specific compounds which are suitable vulcanization accelerators include zinc diethyl-dithiocarbamate. N,N-di-methyl-S-tert-butylsulfenyldithiocarbamate, tetramethylthiuram disulfide, 2,2'-dibenzothiazyl disulfide, butyraldehydeaniline, mercaptobenzothiazole, N-oxydiethylene-2-benzothiazole sulfenamide, and N-cyclohexy-2-benzothiazole sulfenamide. Materials used in the compounding which function as an accelerator activator include metal oxides such as zinc oxide, magnesium oxide and litharge, which are used in conjunction with acidic materials such as fatty acid, for examples, stearic acid, oleic acid, myristic acid, and the like. Rosin acids can also be employed as the acidic material. An antioxidant is usually included in the compounding recipe in an amount ranging, for example, from 0.5 to 3.0 parts by weight per 100 parts by weight of rubber. Examples of suitable antioxidants include phenyl-$\beta$-naphthylamine, di-tert-butylhydroquinone, 2,2,4-trimethyl-6-phenyl-1,2-dihydroquinoline, a physical mixture of a complex diaryl-amineketone reaction product and N,N'-diphenyl-p-phenylene diamine, and the like. It is to be understood that it is not intended to limit the invention to any particular compounding recipe for the invention is broadly applicable to the use of silica containing conjugated diene, heterocyclic nitrogen base copolymer adhesives to bond a wide range of compounded rubber formulations to iron or steel surfaces.

The $Cu^{++}$ treatment plus the adhesives of this invention exhibit useful adhesion on ferrous (steel and iron) surfaces that have been degreased and freed of any weakly adherent oxide coatings, preferably by etching.

The adhesive is coated on the $Cu^{++}$ treated surface by any of the usual methods such as dipping, brushing, spraying etc. and then dried briefly at room temperature or by the application of heat to remove solvents and/or water. The compounded rubber stock is then contacted with the adhesive surface and the whole assembly vulcanized with heat and pressure to complete the bonding process.

It is to be understood that it is not intended to limit the invention to any particular rubber compounding recipe, for the invention is broadly applicable to a wide range of compounded rubber formulations yielding high bond strengths through the $Cu^{++}$ treatment of the metal surface followed by the conjugated diene, heterocyclic nitrogen base interpolymer.

The most surprising fact is that, during the vulcanization, the combination of the weakly adherent Cu-layer and aforementioned interpolymer layer can be converted into a very tight bond. The mechanism is not understood.

The properties of the interpolymer of the adhesive can be modified, e.g., tackiness, hardness, and oxidation stability, by adding one or more or a combination of plasticizers, fillers, curatives and antioxidants prior to the application to the metal surface.

The invention will be better understood by reference to the following illustrative examples, wherein all parts are by weight.

EXAMPLE 1

(a)

Steel bead wires ($d=0.96$mm) were solvent degreased, etched for 20 seconds in concentrated hydrochloric acid at 55° C, rinsed in water, dipped first into a 5% aqueous cupric chloride solution for 5 seconds, rinsed in water and then dipped into a butadiene, styrene, 2-vinyl pyridine polymer latex [Composition 70:15:15 weight percent, 12% resin solids (Adhesive Latex No. 1)] and then dried at 170° C for 60 seconds. The coated bead wires were then vulcanized in an H-test mold under 60 kg/cm² pressure at the indicated times and temperatures with the given rubber formulations. The vulcanized samples were allowed to relax for 24 hours at room temperature, then placed into an oven at 120° C for 20 minutes, then tested at 120° C.

The H-test employed in this and other examples is conducted by vulcanizing the coated wire under a pressure of 60 kg/cm² into the center of two blocks of rubber each having a width and length of 2 cm and a thickness of 1 cm. The two blocks are separated by a distance of 2.5 cm; the wire is embedded 2 cm into each block, the total wire length being 6.2 cm. The blocks are pulled apart at 200 mm per minute lineally with the wire axis until the wire is extracted from one of the blocks.

A sample prepared as above described was compared with samples prepared under identical conditions but where in one case the wire was only etched, in another case the wire was etched and copper coated but no adhesive was used, and in a third case where the wire was etched and coated with the Adhesive Latex No. 1 but without having been first copper coated.

| Rubber Formulation No. 1 | |
|---|---|
| Natural Rubber | 100 |
| Carbon Black HAF* | 50 |
| Sulfur | 5 |
| Pine Tar | 3 |
| Stearic Acid | 1 |
| β-Phenylnaphthylamine | 1 |
| Zinc Oxide | 8 |
| 2-Mercaptobenzothiazole | 1.5 |
| Total: | 169.5 |

*ASTM N330 High Abrasion Furnace

Carbon Vulcanization Time: 30 minutes
Vulcanization Temperature: 135° C

| Condition | Adhesion kg/2 cm at 120° C |
|---|---|
| Etched Wire | 5 |
| Etched wire & Copper coating | 12 |
| Etched wire & Adhesive latex No. 1 | 10 |
| Etched wire & Copper coating & Adhesive latex No. 1 | 56 |

(b)

Steel bead wires were solvent degreased, electrolytically etched for 5 seconds in 25% sulfuric acid at room temperature at a current density of 0.5 Amp/cm² washed with water, dipped into an aqueous solution of cupric chloride, washed with water, coated with Adhesive latex No. 2 (Composition butadiene, 2-vinyl pyridine 85:15 weight percent, 12% resin solids), dried at 120° C for 45 seconds and bonded with Rubber Formulation No. 2. The tests of Example 1(a) were repeated.

| Rubber Formulation No. 2 | |
|---|---|
| Natural Rubber | 100 |
| Carbon Black HAF | 50 |
| Sulfur | 5 |
| Pine Tar | 3 |
| Stearic Acid | 1 |
| β-Phenylnaphthylamine | 1 |
| Cobalt napthenate | 2.5 |
| Zinc Oxide | 8 |
| 2-Mercaptobenzothiazole | 1.5 |
| Total: | 172.0 |

Vulcanization Time: 30 minutes
Vulcanization Temperature: 135° C

| Condition | Adhesion kg/2 cm at 120° C |
|---|---|
| Etched wire only | 16 |
| Etched wire & Copper coating | 15 |
| Etched wire & Adhesive latex No. 2 | 21 |
| Etched wire & Copper coating & Adhesive latex No. 2 | 72 |

(c)

Steel bead wires were treated as in Example 1(b), and bonded to Rubber Formulation No. 1 and tested as described above.

| Condition | Adhesion kg/2 cm at 120° C |
|---|---|
| Etched wire | 5 |
| Etched wire & Copper coating | 11 |
| Etched wire & Adhesive latex No. 2 | 16 |
| Etched wire & Copper coating & Adhesive latex No. 2 | 69 |

EXAMPLE 2

This example clearly illustrates that the present invention may utilize a wide variety of elastomers of various formulations. Steel bead wires were treated as in Example 1(a); two adhesive polymers were utilized, Adhesive latex No. 1 (Composition butadiene, styrene, vinyl pyridine, 70:15:15 at 12% resin solids) and Adhesive latex No. 3 (Composition butadiene, 2-vinyl pyridine, 90:10 weight percent at 12% resin solids), both of which coatings were dried at 170° C for 60 seconds.

Again, the synergistic effect of copper plus the instant interpolymer adhesive is evident even though the rubber compositions are varied in either elastomer or filler content. See the following Tables 1 and 2.

Table 1

| Formulation | #1 | #2 | #3 | #4 | #5 | #6 | #7 |
|---|---|---|---|---|---|---|---|
| Natural Rubber | 100 | 100 | 100 | 100 | 100 | 100 | 100 |
| Carbon Black MPC[1)] | | | 70 | 40 | 15 | 40 | 40 |
| Carbon Black HAF[2)] | 50 | 50 | | | | | |
| Silica, Hi-Sil 233 | | | | 30 | 55 | | |
| Bentonite | | | | | | 30 | |
| Activated clay | | | | | | | 30 |
| Sulfur | 5 | 5 | 5 | 3.5 | 5 | 5 | 5 |
| Pine Tar | 3 | 3 | 3 | 4 | 3 | 3 | 3 |
| Stearic Acid | 1 | 1 | 1 | | 1 | 1 | 1 |
| β-Phenylnaphthylamine | 1 | 1 | 1 | 1 | 1 | 1 | 1 |
| Cobalt Napthenate | | 2.5 | | 5 | | | |
| Zinc Oxide | 8 | 8 | 8 | 10 | 8 | 8 | 8 |
| Accelerator MBT[3)] | 1.5 | 1.5 | 1.5 | | 1.5 | 1.5 | 1.5 |
| Accelerator DBM[4)] | | | | 1 | | | |
| Total | 169.5 | 172.0 | 189.5 | 194.5 | 189.5 | 189.5 | 189.5 |
| Vulcanization | | | | | | | |
| Time, minutes | 60 | 60 | 60 | 90 | 60 | 60 | 60 |
| Temperature, ° C | 135 | 135 | 135 | 145 | 135 | 135 | 135 |
| Adhesion kg/2 cm at 120° C | | | | | | | |

Table 1-continued

| Formulation | Natural Rubber #1 | #2 | #3 | #4 | #5 | #6 | #7 |
|---|---|---|---|---|---|---|---|
| Etched wire | 5 | 9 | 8 | 10 | 9 | 7 | 5* |
| Etched wire & Copper coating | 12 | 15 | 15 | 13 | 11 | 10 | 14* |
| Etched wire & Adhesive latex #1 | 10 | 9 | 12 | 11 | 10 | 16 | 14* |
| Etched wire & Adhesive latex #3 | 8 | 13 | 12 | 14 | 18 | 9 | 11* |
| Etched wire & Copper coating & Adhesive latex #1 | 56 | 47 | 46 | 44 | 41 | 45 | 49 |
| Etched wire & Copper coating & Adhesive latex #3 | 50 | 53 | 48 | 45 | 47 | 40 | 47 |

*Controls
1) ASTM S-301 Medium Process Channel
2) ASTM N-330 High Abrasion Furnace
3) 2-Mercaptobenzothiazole
4) 2-Benzothiazyl-S-2, 4-dinitrophenyl-thioether

Table 2

| Formulation | Synthetic Rubbers #8 | #9 | #10 | #11 |
|---|---|---|---|---|
| Polybutadiene | 100 | 100 | | |
| Polyisoprene | | | 100 | |
| Styrene-butadiene | | | | 100 |
| Carbon Black MPC | 70 | | 70 | |
| Carbon Black HAF | | 70 | | 70 |
| Sulfur | 3.5 | 1.5 | 3.5 | 1.5 |
| Pine Tar | 4 | | 4 | |
| Stearic Acid | | 2 | | 2 |
| β-Phenylnaphthylamine | 1 | | 1 | |
| Cobalt naphthenate | 5 | | | |
| Zinc Oxide | 10 | 5 | 10 | 5 |
| Accelerator $Dm^{5)}/Cz^{6)}$ | 0.5/0.5 | 0.5/0.5 | | |
| Accelerator NOBG[7] | | 1 | | 1.3 |
| Total: | 194.5 | 179.5 | 189.5 | 179.8 |
| Vulcanization | | | | |
| Time, Minutes | 30 | 30 | 30 | 30 |
| Temperature, °C | 155 | 155 | 155 | 155 |
| Adhesion kg/2 cm at 120° C | | | | |
| Etched wire | 7 | 5 | 10 | 5* |
| Etched wire & Copper coating | 10 | 8 | 12 | 11* |
| Etched wire & Adhesive latex #1 | 14 | 12 | 14 | 7* |
| Etched wire & Adhesive latex #3 | 13 | 10 | 18 | 9* |
| Etched wire & Copper coating & Adhesive latex #1 | 48 | 41 | 47 | 38 |
| Etched wire & Copper coating Adhesive latex #3 | 46 | 39 | 58 | 33 |

*Controls
5) Dibenzothiazyl disulfide
6) Cyclohexyl-benzothiazyl Sulfenamide
7) N-oxydiethylene benzothiazyl-2-Sulfenamide

EXAMPLE 3

Steel bead wires were treated as in Example 1(a) except that adhesive latices with varying amounts of vinyl pyridine were utilized; the adhesive coated wires which were vulcanized with Rubber Formulation No. 1 were dried at 170° C for 60 seconds (Table 3) and the adhesive coated wires which were vulcanized with Rubber Formulation No. 2 were dried at 120° C for 45 seconds, (Table 4).

Table 3

| Adhesive Latex | Copolymer Adhesives #4 | #5 | #6 | #3 | #2 | #7 | #8 | #9 |
|---|---|---|---|---|---|---|---|---|
| Monomer Weight % | | | | | | | | |
| 1,3-Butadiene | 100 | 99 | 95 | 90 | 85 | 80 | 75 | 70 |
| 2-Vinyl pyridine | 0 | 1 | 5 | 10 | 15 | 20 | 25 | 30 |
| Adhesion kg/2 cm at 120° C | | | | | | | | |
| Etched wire | 5 | 6 | 5 | 8 | 6 | 7 | 8 | 5* |
| Etched wire & Copper coating | 12 | 14 | 10 | 12 | 15 | 16 | 12 | 10* |
| Etched wire & Adhesive Latex | 6 | 11 | 16 | 16 | 17 | 15 | 10 | 8* |
| Etched wire & Copper coating & Adhesive Latex | 13 | 37 | 40 | 44 | 50 | 44 | 32 | 15 |

*Controls

Adhesive latex No. 4, which contains no vinyl pyridine, was used as the control in the above tests. The optimum range of vinyl pyridine content is approximately 1 to 25 weight % for this series of latices.

Table 4

| Adhesive Latex | Terpolymer Adhesives #10 | #11 | #12 | #13 | #14 | #15 | #16 | #17 |
|---|---|---|---|---|---|---|---|---|
| Monomer Weight % | | | | | | | | |
| 1,3-Butadiene | 99 | 98 | 94 | 84 | 79 | 74 | 64 | 54 |
| Styrene | 1 | 1 | 1 | 1 | 1 | 1 | 1 | 1 |

Table 4-continued

| | Terpolymer Adhesives | | | | | | | |
|---|---|---|---|---|---|---|---|---|
| Adhesive Latex | #10 | #11 | #12 | #13 | #14 | #15 | #16 | #17 |
| 2-Vinyl pyridine | 0 | 1 | 5 | 15 | 20 | 25 | 35 | 45 |
| Adhesion kg/2 cm at 120° C | | | | | | | | |
| Etched wire | 10 | 11 | 12 | 16 | 15 | 13 | 10 | 12* |
| Etched wire & Copper Coating | 15 | 16 | 17 | 15 | 18 | 15 | 16 | 15* |
| Etched wire & Adhesive latex | 6 | 10 | 12 | 15 | 13 | 9 | 6 | 5* |
| Etched wire & Copper coating & Adhesive Latex | 15 | 49 | 54 | 72 | 54 | 50 | 41 | 25 |

*Controls

Adhesive latex No. 10, which contains no vinyl pyridine, was used as the control. The optimum range of vinyl pyridine content is approximately 1 to 35 weight % for this series of latices.

EXAMPLE 4

This example illustrates the invention utilizing a variety of interpolymer compositions as the adhesive.

Steel bead wires were treated as in Example 1(a) except that adhesive latices with varying amounts of butadiene and styrene were utilized; the adhesive coated wires were dried at 120° C for 45 seconds and bonded to Rubber Formulation No. 2.

Table 5

| Adhesive latex | #11 | #2 | #13 | #1 | #18 | #19 | #20 |
|---|---|---|---|---|---|---|---|
| Monomer Weight % | | | | | | | |
| 1,3-Butadiene | 98 | 85 | 84 | 70 | 60 | 50 | 40 |
| Styrene | 1 | 0 | 1 | 15 | 25 | 35 | 45 |
| 2-Vinyl pyridine | 1 | 15 | 15 | 15 | 15 | 15 | 15 |
| Adhesion | | | | | | | |
| kg/2 cm at 120° C | 39 | 74 | 72 | 59 | 45 | 45 | 20 |

EXAMPLE 5

Steel bead wires were treated as in Example 1(a) except that various monomers were utilized in the adhesive coating resin; the coated wires were dried at 120° C for 45 seconds and bonded with Rubber Formulation No. 2.

Table 6

| Adhesive Latex | #21 | #22 | #23 | #24 | #25 |
|---|---|---|---|---|---|
| Monomer Weight % | | | | | | 
| 1,3-Butadiene | | 80 | 80 | 80 | 74 |
| Isoprene | 80 | | | | |
| 2-Vinyl pyridine | 15 | | 15 | 15 | |
| 4-Vinyl pyridine | | 15 | | | |
| 2-Methyl-5-Vinyl pyridine | | | | | 10 |
| Styrene | 5 | 5 | | | 16 |
| Methyl methacrylate | | | | 5 | |
| Acrylonitrile | | | 5 | | |
| Adhesion | | | | | |
| kg/2 cm at 120° C | 50 | 52 | 55 | 73 | 48 |

EXAMPLE 6

This example demonstrates the superiority of the heat aging of the present invention in vulcanized rubber over the heat aging of brass in vulcanized rubber.

Steel bead wire was etched as in Example 1(a), dipped into an aqueous 5% cupric chloride solution, rinsed with water, coated with Adhesive latex No. 1 (Composition: butadiene, styrene, vinyl pyridine 70:15:15 weight percent, 12% resin solids), dried at 120° C for 45 seconds and vulcanized with Rubber Formulation No. 2. Conventionally produced brass samples were vulcanized in the same mold alternating with samples of the present invention. The molded samples were allowed to relax for 24 hours at room temperature, then put into a forced air draft oven at 120° C for the indicated time, at which point the samples were removed from the oven, allowed to relax for 24 hours at room temperature and then tested at 120° C. Adhesion strength was plotted versus heat aging time and is illustrated in the drawing figure.

The brass samples lost about 55% of their bond strength in a period of 48 hours at 120° C, all samples showing varying percentages of bare metal along with rubber failure. The samples of the present invention did not show any adhesive failure but only a cohesive failure in the rubber. The latter loss is approximately 27% for this rubber over the 48 hour period plotted.

EXAMPLE 7

Heat aging samples were prepared as in Example 6 except that Adhesive latex No. 2 was used in the place of Adhesive latex No. 1. Rubber Formulation No. 2 was used for sample preparation. Similar results were obtained, with adhesion strength at 170° C declining over 48 hours from about 70 kg/2 cm to about 52 kg/2 cm for the samples of the present invention while the brass samples showed a decline from about 56 kg/2 cm to about 26 kg/2 cm.

The brass samples lost about 55% of their bond strength in a period of 48 hours at 120° C, all samples showing varying percentages of bare metal along with rubber failure. The samples of the present invention did not show any adhesive failure, but only a cohesive failure in the rubber. The latter loss is approximately 27% for this rubber over the 48 hour period

EXAMPLE 8

Heat aging samples were prepared as in Example 6 except that Adhesive latex No. 2 was used in the place of Adhesive latex No. 1 and Rubber Formulation No. 12 was utilized for sample preparation.

| Rubber Formulation #12 | |
|---|---|
| Natural Rubber | 60 |
| Styrene-Butadiene Rubber | 40 |
| Carbon Black HAF | 120 |
| Sulfur | 5 |
| Stearic Acid | 1 |
| Zinc Oxide | 3 |
| Process Oil | 20 |
| Dibenzothiazyl disulfide | 1 |
| Total: | 250 |
| Vulcanization Time: | 30 minutes |
| Vulcanization Temperature: | 145° C |

Again, similar results were obtained with adhesion strength at 120° C declining over 96 hours from about 57 kg/2 cm to about 43 kg/2 cm for the samples of the present invention, while the brass samples showed a decline from about 54 kg/2 cm to about 20 kg/2 cm.

The brass samples lost about 64% of their bond strength in a period of 96 hours at 120° C, all samples showing varying percentages of bare metal along with rubber failure. The samples of the present invention did not show any adhesive failure but only a cohesive failure in the rubber. The latter loss is approximately 26% for this rubber over the 96 hour period.

EXAMPLE 9

The process of Example 1 was followed using Rubber Formulation No. 1 and Adhesive latex No. 2 with the dip time of the wire in the cupric chloride being varied. The results were as follows:

Table 7

| dip time (seconds) in 5% CuCl$_2$ soln | 1 | 3 | 5 | 7 | 0 |
|---|---|---|---|---|---|
| H-Test results (Kg/2 cm at 120° C) | 56 | 52 | 46 | 44 | 10 |

EXAMPLE 10

Example 9 was repeated except instead of dipping in 5% CuCl$_2$ 2H$_2$O solution, the following solutions and times were used.

Table 8

| # of test | 1 | control |
|---|---|---|
| conc. of aq. sol'n | 5% CuBr$_2$ | 5% CuSO$_4$ . 5H$_2$O |
| dip time (sec) | 2 | 3 |
| H-Test result Kg/2 cm at 120° C | 44 | 18 |

EXAMPLE 11

Example 10 was repeated, using the following copper salt solutions and dipping times for Rubber Formulation No. 2 and Adhesive latex No. 3. The same procedures of coating and drying as in Example 10 were used.

Table 9

| Test # | conc. of aq. sol'n | dip time (sec.) | H-Test result Kg/2cm at 120° C |
|---|---|---|---|
| control | 5% CuSO$_4$ . 5H$_2$O | 3 | 32 |
| 1 | 5% CuCl$_2$ . 2H$_2$O | 3 | 52 |
| 2 | 5% CuSO$_4$ . 5H$_2$O + 1% NaCl | 3 | 43 |
| 3 | 5% CuSO$_4$ . 5H$_2$O + 1% KBr | 3 | 44 |
| 4 | 5% CuBr$_2$ | 3 | 50 |
| control | 5% Cu(NO$_3$)$_2$ . 3H$_2$O | 3 | 22 |
| 5 | 5% Cu(NO$_3$)$_2$ . 3H$_2$O + 1% NaCl | 3 | 41 |
| 6 | 5% CuCl$_2$ . 2H$_2$O | 0.5 | 42 |
| *control | 5% CuCl$_2$ . 2H$_2$O 3 | 25 | |

*3 sec. dip in CuCl$_2$ sol'n then wipe off the plated copper with wet paper towel and subsequently dip in latex.

The above tests show that the anions other than halides did not produce the high bonding in the absence of added halide ions.

As many possible embodiments may be made of this invention without departing from the scope thereof, it is to be understood that all matter herein set forth is to be interpreted as illustrative and not as unduly limiting the invention.

What is claimed is:

1. A laminated article comprising a ferrous metal substrate having a lossely adherent deposit of copper thereon, a layer of adhesive over said copper and rubber bonded through said copper and adhesive to said ferrous metal substrate, said adhesive consisting essentially of an interpolymer containing about 50 to about 99% by weight of a conjugated diene, about 1–45% by weight of a heterocyclic base and 0 to about 40% by weight of at least one additional monomer copolymerized therewith.

2. A laminated article according to claim 1, wherein, said conjugated diene is a hydrocarbon containing 4 to 8 carbon atoms, a halogen-substituted hydrocarbon containing 4 to 8 carbon atoms or a lower alkoxy-substituted hydrocarbon containing 4 to 8 carbon atoms.

3. A laminated article according to claim 1 wherein, said heterocyclic nitrogen base has the formula wherein R is selected from the group consisting of hydrogen, alkyl, vinyl, alpha-methylvinyl, alkoxy, halo, hydroxy, cyano, aryloxy, aryl, halo-alkyl, hydroxy alkyl, alkoxy-alkyl, cyano-alkyl, halo aryl, alkoxy aryl, hydroxy aryl, cyano aryl, and alkyl aryl, one of said R's having the formula CH$_2$=C< and the total number of carbon atoms in each R substituent being not greater than 15.

4. A laminated article according to claim 1 wherein, said heterocyclic nitrogen base is selected from the group consisting of 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6 tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2-decyl-5-(alphamethylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dibromopyridine; 2-vinyl-4-chloro-5-bromopyridine; 2(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alphamethylvinyl)-8-dodecyl quinoline; 3-vinylisoquinoline; 1,6-dimethyl-3-vinylisoquinoline; 2-vinyl-4-benzyl-quinoline; 3-vinyl-5-chloroethylquinoline; 3-vinyl-5,6-dichloroisoquinoline; 2-vinyl-6-ethoxy-7-methylquinoline and 3-vinyl-6-hydroxymethylisoquinoline.

5. A laminated article according to claim 1 wherein, said rubber is selected from the group consisting of natural rubber, polybutadiene, polyisoprene, copolymers of butadiene with styrene, copolymers of butadiene with acrylonitrile, and polychloroprene.

6. A laminated article according to claim 1 wherein, said interpolymer is a copolymer of butadiene and 2-vinyl pyridine.

7. A laminated article according to claim 1 wherein, said additional monomer is an organic compound containing at least one polymerizable ethylenic group.

8. A laminated article according to claim 1 wherein, said added monomer is selected from the group consisting of styrene, 3-phenyl-3-butene-1-ol, p-chlorostyrene, p-methoxystyrene, alpha-methyl styrene, vinyl naphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropyl ketone, methyl vinyl ketone, methyl vinyl ether, vinyl acetate, vinyl chloride, vinylidene chloride, vinyl furane, vinyl carbazole, and vinyl acetylene.

9. A laminated article according to claim 1 wherein, said interpolymer is a terpolymer of styrene, butadiene and 2-vinyl pyridine.

10. A laminated article according to claim 1 wherein, said interpolymer is a terpolymer of 2-vinyl pyridine, isoprene and styrene.

11. A laminated article according to claim 1 wherein, said interpolymer is a terpolymer of 4-vinyl pyridine, butadiene and styrene.

12. A laminated article according to claim 1 wherein, said interpolymer is a terpolymer of 2-methyl-5-vinyl pyridine, butadiene and styrene.

13. A process for bonding rubber to a ferrous metal substrate which comprises depositing a loosely adherent layer of copper on said ferrous metal substrate, applying an adhesive thereover, said adhesive consisting essentially of an interpolymer containing about 50 to about 99% by weight of a conjugated diene, about 1-45% by weight of a heterocyclic base and 0 to about 40% by weight of at least one additional monomer copolymerized therewith, thereafter contacting said adhesive with the rubber to be bonded and bonding by heat and pressure.

14. A process according to claim 13 wherein said loosely adherent layer of copper is deposited by electroless deposition from a solution of a cupric salt, said solution containing halide ions therein.

15. A process according to claim 14 wherein said deposition of copper is effected by dipping the said ferrous metal substrate in said solution for less than sixty seconds.

16. A process according to claim 14 wherein said solution is a solution of cupric bromide or cupric chloride.

17. The process of claim 13 wherein said conjugated diene is a hydrocarbon containing 4 to 8 carbon atoms, a halogen-substituted hydrocarbon containing 4 to 8 carbon atoms or a lower alkoxy-substituted hydrocarbon containing 4 to 8 carbon atoms.

18. A process according to claim 13 wherein said heterocyclic nitrogen base has the formula or -continued wherein R is selected from the group consisting of hydrogen, alkyl, vinyl, alpha-methylvinyl, alkoxy, halo, hydroxy, cyano, aryloxy, aryl, halo-alkyl, hydroxy alkyl, alkoxy-alkyl, cyano-alkyl, halo aryl, alkoxy aryl, hydroxy aryl, cyano aryl, and alkyl aryl, one of said R's having the formula $CH_2=C=<$ and the total number of carbon atoms in each R substituent being not greater than 15. -bromopyridine;

19. A process according to claim 13 wherein said heterocyclic nitrogen base is selected from the group consisting of 2-vinyl pyridine; 2-vinyl-5-ethylpyridine; 2-methyl-5-vinylpyridine; 4-vinyl pyridine; 2,3,4-trimethyl-5-vinylpyridine; 3,4,5,6 tetramethyl-2-vinylpyridine; 3-ethyl-5-vinylpyridine; 2,6diethyl-4-vinylpyridine; 2-isopropyl-4-nonyl-5-vinylpyridine; 2-methyl-5-undecyl-3-vinylpyridine; 2-decyl-5-(alpha-methylvinyl)pyridine; 2-vinyl-3-methyl-5-ethyl-pyridine; 2-methoxy-4-chloro-6-vinylpyridine; 3-vinyl-5-ethoxypyridine; 2-vinyl-4,5-dibromopyridine; 2-vinyl-4-chloro-5-brompyridine; 2(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenyl pyridine; 2-(paramethylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propyl quinoline; 2-methyl-4-nonyl-6-vinylquinoline; 4(alphamethylvinyl)-8-dodecyl quinoline; 3-vinylisoquinoline; 1,6-dimethyl-3-vinylisoquinoline; 2-vinyl-4-benzyl-quinoline; 3-vinyl-5-chloroethylquinoline; 3-vinyl-5,6-dichloroisoquinoline; 2-vinyl-6-ethoxy-7-methylquinoline and 3-vinyl-6-hydroxymethylisoquinoline.

20. A process according to claim 13 wherein said rubber is selected from the group consisting of natural rubber, polybutadiene, polyisoprene, copolymers of butadiene with styrene, copolymers of butadiene with acrylonitrile, and polychloroprene.

21. A process according to claim 13 wherein said interpolymer is a copolymer of butadiene and 2-vinyl pyridine.

22. A process according to claim 13 wherein said additional monomer is an organic compound containing at least one polymerizable ethylenic group.

23. A process according to claim 13 wherein said additional monomer is selected from the group consisting of styrene, 3-phenyl-3-butene-1-ol, p-chlorostyrene, p-methoxystyrene, alpha-methyl styrene, vinyl naphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropyl ketone, methyl vinyl ketone, methyl vinyl ether, vinyl acetate, vinyl chloride, vinylidene chloride, vinyl furane, vinyl carbazole, and vinyl acetylene.

24. A process according to claim 13 wherein said interpolymer is a terpolymer of styrene, butadiene and 2-vinyl pyridine.

25. A process according to claim 13 wherein said interpolymer is a terpolymer of 2-vinyl pyridine, isoprene and styrene.

26. A process according to claim 13 wherein said interpolymer is a terpolymer of 4-vinyl pyridine, butadiene and styrene.

27. A process according to claim 13 wherein said interpolymer is a terpolymer of 2-methyl-5-vinyl pyridine, butadiene and styrene.

* * * * *

UNITED STATES PATENT AND TRADEMARK OFFICE
CERTIFICATE OF CORRECTION

PATENT NO. : 4,049,875
DATED : September 20, 1977
INVENTOR(S) : Dennis L. EDIE

It is certified that error appears in the above-identified patent and that said Letters Patent are hereby corrected as shown below:

1. Column 1, line 50, change "isocyanates" to --isocyanate--.

2. Column 1, line 54, change "high" to --highly--.

3. Column 5, line 55, change "only of" to --only one of--.

4. Column 6, line 16, change "cann" to --can--.

5. Column 7, line 67, change "N-cyclohexy-" to --N-cyclohexyl- --.

6. Column 8, lines 14-20, delete sentence beginning "It is to be understood..." and ending on line 20 "...steel surfaces."

7. Column 14, line 36, change "170°C" to --120°C--.

8. Column 15, line 51, the "3" and "25" are not lined up under their proper columns.

UNITED STATES PATENT AND TRADEMARK OFFICE
CERTIFICATE OF CORRECTION

PATENT NO. : 4,049,875
DATED : September 20, 1977
INVENTOR(S) : Dennis L. EDIE

It is certified that error appears in the above–identified patent and that said Letters Patent are hereby corrected as shown below:

9. Column 18, line 16, delete "bromopyridine".

10. Column 18, line 27, change "brompyridine" to --bromopyridine--.

Signed and Sealed this

Second Day of May 1978

[SEAL]

Attest:

RUTH C. MASON
Attesting Officer

LUTRELLE F. PARKER
Acting Commissioner of Patents and Trademarks